Feb. 15, 1949.   A. B. NEWTON   2,461,760
MULTIPLE REFRIGERATION SYSTEM WITH CONTROLS THEREFOR
Filed April 1, 1944   4 Sheets-Sheet 1

Fig. 1.

Inventor
ALWIN B. NEWTON
BY George H. Fisher
Attorney

Fig. 3.

Patented Feb. 15, 1949

2,461,760

UNITED STATES PATENT OFFICE 2,461,760

MULTIPLE REFRIGERATION SYSTEM WITH CONTROLS THEREFOR

Alwin B. Newton, Minneapolis, Minn., assignor to Minneapolis-Honeywell Regulator Company, Minneapolis, Minn., a corporation of Delaware Application April 1, 1944, Serial No. 529,137

19 Claims. (Cl. 62—4)

In some applications of refrigeration systems such as cooling air, the refrigeration system is required not only to cool the required amount of air but it is also required to exercise some control over the relative humidity of said air. In the past, the problem of satisfactorily controlling the amount of cooling has not been unduly difficult, but prior to the present invention no entirely satisfactory control of both cooling and humidity has been found. Previous systems used involved unsatisfactory control of either humidity or the amount of refrigeration or else were subject to mechanical difficulties of the equipment. It is well known in air conditioning that when air is passed in contact with means cooled below the dew-point of its contained moisture, moisture condenses out, thereby changing the total moisture content of the air. The problem here involved, as will be seen, involves not only a controlled cooling of the required amount of air but also a control of the humidity of said air in the desired manner, this being accomplished by controlling the minimum temperature of the cooling means. It is therefore an object of the present invention to improve the control of a refrigeration system.

It is a further object not only to control the amount of refrigeration available from the evaporator but to also control the temperature of that evaporator, thereby controlling the amount of moisture withdrawn from the air.

Another object of this invention is to improve the control of a refrigeration system by controlling the flow of refrigerant to an evaporator.

It is another object to improve the control of a refrigeration system by controlling the amount of refrigerant flowing through an evaporator by controlling the amount of refrigerant diverted through by-pass means.

It is a further object of this invention to so control a refrigeration system that the minimum evaporator temperature may be controlled by humidity responsive means.

It is a further object of this invention to control a refrigeration system over a wide range of temperatures and capacities but keeping within limitations imposed by the mechanical equipment.

It is also an object of this invention to provide a control system inherently adapted for multiple compressor and multiple evaporator systems. Some present systems of control become impractical in large refrigeration systems involving multiple compressors and multiple evaporators, but in the present system excellent control is achieved in all systems and overall efficiency is relatively high in the larger systems.

It is an object of this invention to provide a system of refrigeration control inherently adapted to air conditioning work by its ability to remove variable amounts of moisture from the air with variation in the cooling load.

These and other objects will become apparent upon a study of the following specification and drawings, wherein.

Figure 1:
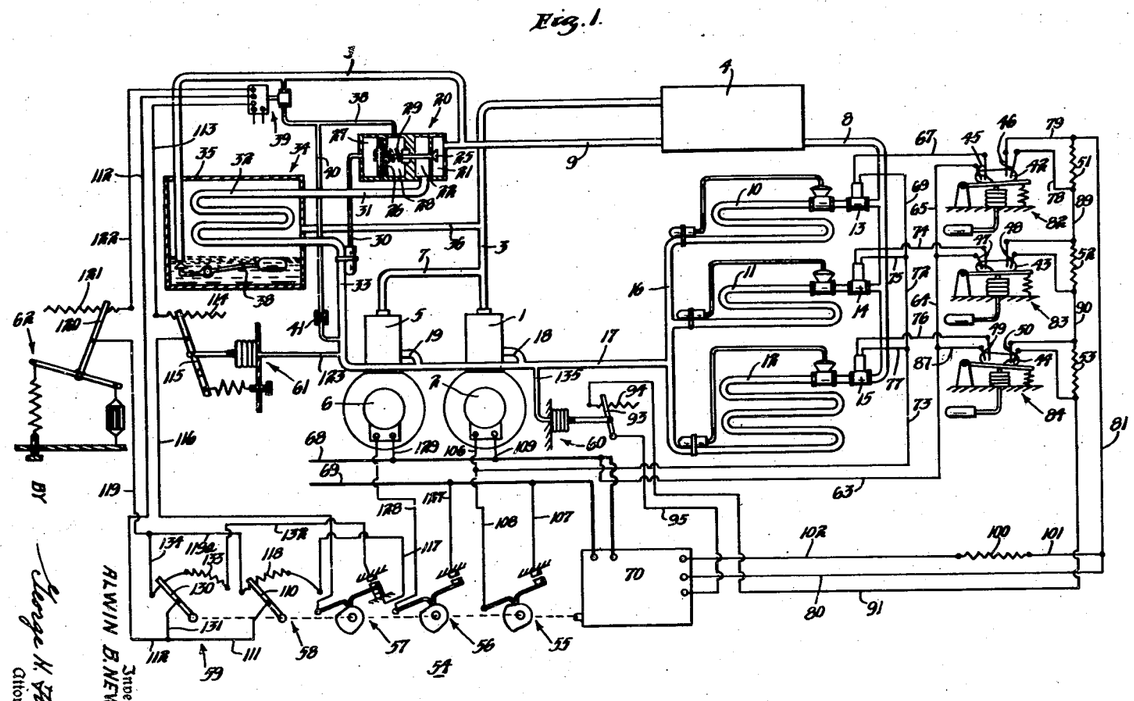
Figure 1 is a schematic showing of the present invention wherein two compressors and three evaporators are used, each evaporator being individually controlled.

In Figure 1, it is noted that two compressors and three evaporators are used but it is to be kept in mind that this arrangement is illustrative only and that any desired number of compressors and evaporators may be used. In this figure, compresser 1 driven by motor 2 discharges through pipe 3 into condenser 4, and compressor 5 driven by motor 6 discharges through pipe 7 into pipe 3. Condenser 4 discharges through liquid lines 8 and 9, line 8 supplying evaporators 10, 11 and 12. The evaporators are controlled by thermostatic expansion valves. Solenoid valves 13, 14 and 15, respectively, are arranged in series with said expansion valves. Evaporators 10, 11 and 12 discharge into pipe 16 which leads to suction pipe 17. Suction pipe 17 connects to compressor 1 by branch 18 and to compressor 5 by branch 19. Liquid line 9 leads to a valve 20. Valve 20 includes chambers 21, 22, 27 and 28. Member 25 of valve 20 controls the flow of refrigerant from chamber 21 to chamber 22, member 25 being connected to a diaphragm 26. Diaphragm 26 separates compartments 27 and 28 which connect to capillary and bulb 30 and to pipe 38, respectively. Spring 29 acting on diaphragm 26 urges valve member 25 towards closed position, whereas thermostatic bulb 30 connected to chamber 27, acts to move valve member 25 toward open position. Chamber 22 of valve 20 connects with inlet pipe 31 of an evaporator 32, and outlet pipe 33 of evaporator 32 connects to the main suction pipe 17. Evaporator 32 is encased within a heat exchanger 34, one of the passages in said exchanger 34 comprising said evaporator 32 and the other passage comprising the space between said evaporator 32 and outer housing 35 of said heat exchanger. Hot, gaseous refrigerant is supplied to heat exchanger 34 through pipe 36 from discharge pipe 3, said gas being exhausted from heat exchanger 34 through pipe 37 which has its inlet near the bottom of housing 35 and is provided with a float valve 38. The gas thus diverted through pipe 36 to exchanger 34 must be liquified and rise to a level sufficient to open float valve 38 before it can be exhausted through said pipe 37. Pipe 37 discharges into liquid line 9. A bleed pipe 38 is taken from pipe 37 and connects to control chamber 28 of valve 20. Bleed pipe 38 includes a modulating motor valve 39. A second bleed pipe 40 connects to pipe 38 and suction pipe 33, said bleed pipe 40 including an orifice 41.

It is noted that useful refrigeration is provided by compressors 1 and 5 discharging through pipe 3 into condenser 4, said condenser 4 supplying evaporators 10, 11 and 12. These evaporators exhaust through pipes 16, 17 and branches 18 and 19 into compressors 1, and 5, respectively, in a more or less conventional manner. It should be further noted that condenser 4 also supplies refrigerant to control evaporator 32. The cooling effect of the control evaporator 32 is utilized to cool hot gases from the compressors and discharges said cooled refrigerant into the liquid line 9 of condenser 4, thereby assuming a portion of the condenser load.

Evaporators 10, 11 and 12 are individually controlled by thermostatic devices 82, 83 and 84, respectively. Device 82 includes mercury switch 42 having oppositely arranged pairs of terminals 45 and 46. Device 83 includes mercury switch 43 having oppositely arranged pairs of terminals 47 and 48. Thermostatic device 84 includes mercury switch 44 having oppositely arranged pairs of terminals 49 and 50. Pairs of terminals 45, 47 and 49 control solenoid valves 13, 14 and 15, respectively, while terminal pairs 46, 48 and 50 control resistors 51, 52 and 53, respectively, and thereby control the operation of a controller 54.

Controller 54 comprises a modulating motor 70, such as that disclosed in Patent 2,028,110 to D. G. Taylor, and cam operated switches driven by same. In addition, two potentiometers 58 and 59 are included in said controller 54, said potentiometers controlling motor valve 39, the motor of said valve being similar to that of controller 54. Cam operated switch 55 controls motor 2 of compressor 1 as well as solenoid valves 13, 14 and 15, cam operated switch 56 controls motor 6 of compressor 5, and cam operated switch 57 is a single pole, double throw device and alternately places potentiometer 58 or 59 in control of said modulating valve 39. The action of controller 54 is modified by a pressure responsive device 60 connected to the main suction pipe 17, and the control exercised by potentiometer 58 or 59 over valve 39 is modified by a pressure responsive device 61 and moisture responsive means 62 in a manner to be shown in the following operation schedule.

*Operation of Figure 1*

To facilitate the illustration of the operation of the system of Figure 1, certain assumptions may be made, such as the division of a refrigerating load upon evaporators 10, 11 and 12, wherein evaporator 10 represents 15 per cent of the total load, 11 represents 35 per cent of the total load, and 12 represents 50 per cent of the total load, and it is desired that the compressors be not started unless 20 per cent of the load requires cooling. It may also be assumed that the evaporators are to be controlled within a temperature range having a maximum of about 60° F., and a minimum of about 20° F. As shown, the system is at rest but operation is about to begin. Evaporator 10 is demanding cooling, but as evaporator 10 represents only 15 per cent of the total load and 20 per cent is required for starting the compressors, its demand cannot start a compressor. A demand for cooling at evaporator 10, as determined by thermostatic device 82, results in tipping mercury switch 42 in such a manner as to bridge terminals 45 and to break contact between terminals 46, thus partially completing the circuit for valve 13, and resistance 51 is placed in the control circuit of controller 54. The circuit for opening valve 13 is: line 68, wires 63, 64 and 65, switch terminals 45, wire 67, valve 13, wires 69, 72, 73 and 108, switch 55, wire 107 and line 69. Since switch 55 is still open, valve 13 cannot open and compressor 1 cannot start. It is assumed that evaporator 11 is also demanding cooling and that its demand has just resulted in thermostatic device 83 tipping mercury switch 43 to bridge terminals 47 and to break contact between terminals 48. This partially completes a circuit for valve 14 in the same manner as valve 13 and adds resistance 52 to the control circuit of controller 54.

The controller 54, as before noted, is driven by a proportioning motor 70, said proportioning motor being of the sort controlled by a balanced control circuit in such a manner that if the control circuit be unbalanced the motor tends to move to balance the circuit. For the purpose of this description, resistance values for the circuit may be as follows, resistor 51 may comprise 60 ohms; resistor 52, 140 ohms; resistor 53, 200 ohms; resistor 100, 200 ohms, and balancing resistor of said motor 70, 200 ohms resistance. The controlling circuit for the motor comprises common wires 80 and 81; a first control leg comprising wires 101, resistor 100, and wire 102, and a second control leg comprising resistor 51, wire 89, resistor 52, wire 90, resistor 53, wire 91, control device 60, and wire 95. It is noted that resistors 51, 52, and 53 are shunted out of the control circuit when their respective thermostatic devices are satisfied. They are added to the control circuit upon a demand for cooling causing their associated thermostatic devices to tip their switches and break contact between the resistance controlling terminals. For instance, resistor 51 is normally shunted out of the control circuit by wire 79, terminals 46, and wire 78, it being assumed that terminals 46 are bridged by the mercury. However, when the mercury flows to the other end of the switch and contact is broken between terminals 46, the only current passed between wire 81 and 89 is through resistor 51, hence the resistance of 51 is thus added to the control circuit. Resistors 52 and 53 are placed in or out of the control circuit in a similar manner. It will be noted that to give a balanced circuit, motor 70 must be in one extreme position when all resistors 51, 52 and 53 are in the circuit and must be in its opposite extreme when none of the resistors 51, 52 and 53 are in the circuit. This may be readily observed by noting that the sum of the resistances of 51, 52 and 53 is 400 ohms. With 400 ohms resistance in one leg of the control circuit, and resistor 100 in the other leg comprising only 200 ohms resistance, then the entire 200 ohms of the follow up resistor of the motor must be added to the leg comprising wires 101, resistor 100, and wire 102, to balance the circuit. This puts the motor in one extreme position. When each of resistors 51, 52 and 53 are shunted out of the control circuit by their respective switches, then there is no appreciable resistance in that leg of the control circuit and, as the other leg includes resistor 100 of 200 ohms resistance, then the entire 200 ohms of the follow up resistor of the motor must be added to the first named control leg to balance the resistance of resistor 100.

With switch terminals 46 open and resistor 51 added to the circuit, motor 70 operates controller 54 in a clockwise direction, but as before stated the amount of movement is insufficient to start a compressor because switches 55 and 56 have been so arranged that a movement corresponding to 20 per cent of total refrigerant capacity or corresponding control resistance, is necessary before a motor can be started. With the thermostatic device 83 just now calling for cooling too, switch 43 is actuated to close a circuit across terminals 47 and to open the circuit across terminals 48, thus adding the resistance of 52 to the control circuit. The combined effect of resistors 51 and 52 drive control motor 70 to half its total travel, thereby closing switch 55 and starting motor 2 of compressor I by the circuit: line 69, wire 107, switch 55, wire 108, wire 106, motor 2, wire 109, and line 68. Closing of switch 55 not only starts motor 2 of compressor I but also completes the circuit to solenoid valves 13 and 14 so that they are now open. Potentiometer 58 is in control of modulating motor valve 39, the control circuit for same being: arm 110, wire 111, wire 112, valve 39, wire 122, potentiometer resistor 121, arm 120, wire 119, wire 119a, potentiometer resistor 118, wire 117, switch 57, wire 116, arm 115, potentiometer resistor 114, wire 113, and motor valve 39. Since arm 110 is now at the mid point of its travel, all of the resistance of potentiometer resistor 118 has been added to the valve control circuit and valve 39 has been driven to its wide open position. When valve 39 is in its wide open position, refrigerant tends to be bled from pipe 37 through pipe 38 into chamber 28 of valve 20 faster than it can be withdrawn through pipe 40 and orifice 41; hence, pressure builds up in said chamber, valve 20 is closed and no refrigerant is by-passed through evaporator 32. Further, as no refrigerant is flowing through evaporator 32, there is little, if any, condensation of refrigerant in heat exchanger 34 and float valve 38 tends to remain closed. Hence, there is little or no by-passing of refrigerant through pipe 36. Therefore, with half the total evaporator load requiring cooling, half of the compressor capacity has been placed in operation to supply same and no appreciable by-passing of refrigerant takes place.

Assume now that thermostatic device 82 responds to a satisfied condition, device 83 is still unsatisfied and device 84 is actuated in response to a demand for cooling. Therefore, terminals 49 are bridged and terminals 50 are opened, whereby resistor 53 is added to the circuit. The opening of the circuit across terminals 45 and the closing of the circuit across terminals 46 results in closing valve 13 and shunting out of the control circuit. Valve 15 is opened upon closing of terminals 49 by a circuit as follows: line 69, wire 107, switch 55, wire 108, wire 73, wire 77, valve 15, wire 76, terminals 49, wire 87, wire 63, and line 68. About 85% of the evaporator capacity is now demanding cooling, hence motor 70 operates to drive controller 54 through about 85% of its total travel to close switch 56, switch 55 remaining closed. Compressor I remains in operation and compressor 5 is put in operation by the circuit: line 69, wire 127, switch 56, wire 128, motor 6, wire 129, and line 68. Switch 57 has also transferred the control of valve 39 to potentiometer 59, the control circuit for motor valve 39 now being: arm 130, wire 131, wire 112, motor valve 39, wire 122, resistor 121, arm 120, wire 119, wire 134, resistor 133, wire 132, switch 57, wire 116, arm 115, potentiometer resistor 114, wire 113 and motor valve 39. As before noted, potentiometer resistor 133 has all its resistance in the latter half of travel of arm 130, and arm 130 has traveled about 85% of its total movement. Valve 39 has therefore been driven about 70% open, hence, valve 20, due to the pressure existing in chamber 28 resulting from the refrigerant bled into same through partially opened valve 39 and removed therefrom through orifice 41, is partially open and refrigerant is being by-passed through liquid line 9, valve 20, pipe 31, coil 32, and pipe 33 into the main suction pipe 17. Further, hot gases flowing from discharge pipe 3 through pipe 36 into heat exchanger 34 may be cooled and condensed by said coil 32, thus causing an accumulation of liquid refrigerant in the bottom of housing 35. When sufficient liquid accumulates to open valve 38, flow of liquid refrigerant through pipe 37 back into liquid line 9 is permitted. As shown, pressure controls 60 and 61 and moisture responsive means 62 have little or no effect on the control of this system as it is thus described, for each of them are in a satisfied position.

In the event that the pressure in the suction pipe 17 should rise above a predetermined high limit, corresponding to an evaporator temperature of about 60° F., for example, pressure control 60 connected to pipe 17 by tube 135 becomes active and moves arm 93 to the right and adds resistance from the potentiometer resistor 94 to the control circuit of motor 70 thereby giving the effect of increased evaporator load and demanding the operation of more compressors or the by-passing of less refrigerant. If the pressure of suction means 17 or 33 falls below a predetermined limit, corresponding to about 20° F., for example, control 61 connected to suction means 33 by tube 123 becomes active and moves switch arm 115 to the right thereby placing a portion of the resistance of potentiometer 114 in the control circuit of valve 39, the addition of said resistance tending to close said valve 39, thereby further opening valve 20 and permitting more refrigerant to be by-passed to relieve the low pressure in suction means 17 and 33.

In the event of high moisture content in the air at moisture responsive means 62, arm 120 is moved to the left of potentiometer resistor 121, thereby adding resistance to the other side of the control circuit of valve 39, thus moving same toward open position; this tends to close valve 20 and decrease the amount of refrigerant by-passed. Lowering the suction pressure in the evaporator and the main suction pipe 17, permits lower temperatures to be attained by said evaporators and increases the amount of moisture that may be removed from the air in contact therewith. As controls 60 and 61 may be considered limit controls, they take precedence over moisture responsive means 62.

When the total capacity of the system is required, as evidenced by demand at all three thermostatic devices 82, 83 and 84, all the resistors 51, 52 and 53 are in the control circuit and motor 70 drives controller 54 to an extreme position. Compressors 1 and 5 are both in operation, switch arm 130 is at an extreme position, modulating valve 39 is wide open, and valve 20 is closed, thereby preventing the diversion of refrigerant, whereupon the system is operating at maximum capacity.

Obviously, the capacity of the system is decreased as the control devices are satisfied, the action being similar to, but in reverse order from that above described.

In summary, in a system of the sort described, on a demand for refrigeration of an evaporator, the step controller is moved proportionately to load demands, and if said load demands be sufficient, a compressor is started. If the compressor has more than enough capacity for said load, a portion of the refrigerant is by-passed in a controlled manner, thereby controlling the amount of refrigerant furnished for said load. Further, the conditions under which said refrigerant is furnished to the evaporator demanding the same is varied in accordance with the humidity, or other condition, in such a manner that upon a rise in relative humidity, lower evaporator temperatures are permitted, thereby removing a larger portion of moisture from the air. If more than one evaporator demands cooling, the combined effects, or total load of the evaporators, causes a corresponding movement of controller 54 and the operation of a predetermined number of compressors. As the number of compressors added to the circuit seldom exactly meets the needs, or load, a controlled by-passing of refrigerant takes place and thus indirectly controls the refrigerant supplied to the evaporators.

By varying the lower limit of suction pressure of the system up or down in response to relative humidity, or by controllably lowering the lower limit of suction pressure as the cooling load increases, applicant gains superior control of temperature and relative humidity. Further, this control is had within the normal operating conditions of the equipment used, thereby insuring dependable operation.

Figure 2:
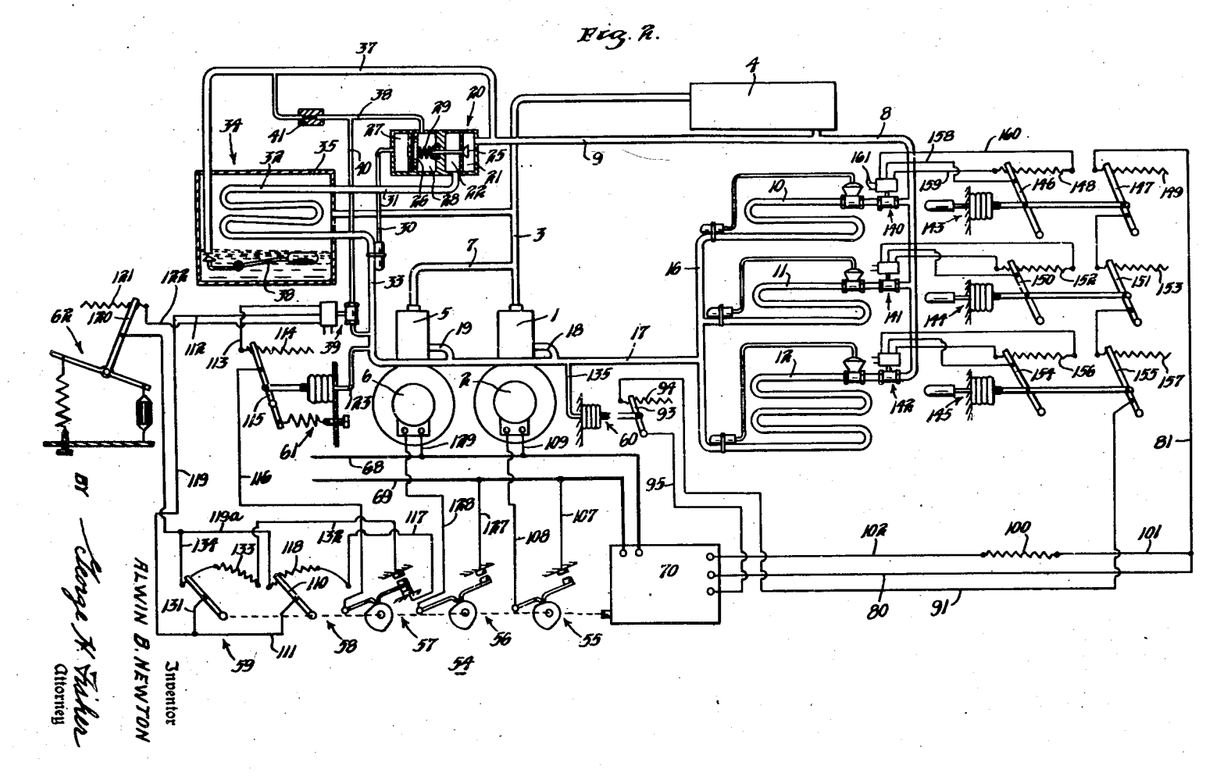
Figure 2 is a view similar to that of Figure 1 but including modulating control of the evaporators.

*Figure 2*

Figure 2 shows a system quite similar to that of Figure 1 but involves a reversal of the position of orifice 41 and modulating valve 39 in control of valve 20. Further, in place of solenoid valves 13, 14 and 15, modulating motor valves 140, 141 and 142, respectively, have been substituted, these valves being under the control of thermostat devices 143, 144 and 145, each of the thermostatic devices controlling two potentiometers. Thermostatic device 143 controls movable arms 146 and 147 which sweep over resistors 148 and 149, respectively; device 144 controls arms 150 and 151 which sweep over resistors 152 and 153, and device 145 controls arms 154 and 155 which sweep over resistors 156 and 157, respectively. The operation of these controls will be brought out in the following operation schedule.

*Operation of Figure 2*

The operation of Figure 2 may involve the same assumptions as to the minimum and maximum evaporator temperatures, or the refrigerant pressures therein, and the relative capacity of said evaporators, as in the previous example, and the minimum demands to start the compressors will again be considered as 20% of the total capacity. Resistors 149, 153 and 157 may be assumed to have 60, 140 and 200 ohms resistance, respectively. It will be seen upon inspection that the operation of the system of Figure 2 is quite similar to that of Figure 1. In the control of valve 20, which regulates the by-passed refrigerant, it will be noted that, due to the reversal of valve 39 and orifice 41 from the position shown in Figure 1, it is now necessary that valve 39 be closed under the same set of conditions wherein it would be opened in the previous example. This is accomplished by merely reversing the control wires. It will be seen that whereas wires 122 and 113 were connected to the top and bottom terminals of motor valve 39 in Figure 1, they are reversed in Figure 2.

As previously noted, valves 140, 141 and 142 are the modulating type rather than the on and off solenoid type, as in the previous example. These valves may be proportionately opened and they may become the actual controlling valves of the evaporators instead of the thermostatic expansion valves with which they are provided, under conditions of light loads. Valves 140, 141 and 142 are in closed position when sliders 146, 150 and 154 are in the extreme left position. As the potentiometer arms are moved to the right, upon temperature increase, the valves will be opened. As an example, the control of valve 140 will be illustrated, the other valves being controlled in a similar manner. The control circuit is: arm 146, wire 158, modulating motor valve 140, wire 160, potentiometer resistor 148, wire 159 and valve 140. Wires 161 constitute the current supply source for actuating modulating valve 140. If desired, the current supply wires for motor valves 140, 141, and 142 may be connected in parallel with compressor motor 2 so that current can be supplied to said valves only after the first compressor is started. As previously noted, each is a modulating valve and regulates the flow of refrigerant to its respective evaporator in response to demand.

Referring to the circuits for controlling device 54, it is noted that the resistors may be added gradually rather than in full amounts, as in Figure 1. As arm 146 sweeps over resistor 148, arm 147 sweeps over resistor 149 and adds resistance to one side of the control circuit of motor 70 of controller 54 proportionate to its travel. As in the previous example, the entire resistance of 149 may be added to the control circuit but this resistance in itself will not advance controller 54 far enough to start a compressor, for evaporator 10 and its associated resistance represents only 15% of the full load and twenty per cent is required to start a compressor. However, assume that switch 147 has swept over one-half of resistor 149, thereby introducing 30 ohms resistance to one side of the control circuit, and the demands of thermostatic device 145 cause arms 154 and 155 to sweep over half their respective resistors. Valves 140 and 142 are driven half open. As arm 155 has swept over 100 ohms of its resistance, there is a total of 130 ohms on one side of the control circuit and motor 70 operates controller 54 sufficiently to balance said circuit. It will be noted that in the present case, various evaporators may each be operated at light loads providing the total load is sufficient to cause operation of a compressor. Thus evaporators 10 and 12, each being operated at half load, represent nearly one-third of the total capacity of the system. Modulating controller 54 is operated in accordance with changes of load even though the load is changed by small amounts and may be distributed among several evaporators. As was previously mentioned, valve 39 and orifice 41 are reversed relative to the showing of Figure 1. Hence to open valve 20, it is necessary that valve 39 be throttled towards closed position to permit pressure to build up in compartment 28, and conversely, to open said valve 20, valve 39 is opened to permit refrigerant to be bled from chamber 28 faster than it may enter same through orifice 41. This variation from that of the previous example forms no real change in principle nor does it affect the overall operation of the system.

In the event of a full demand at each of the evaporators, each of valves 140, 141 and 142 are wide open and all of resistors 149, 153 and 157 are in the control circuit of motor 70. The operation of the system is then at full capacity and similar to that of the previous example. Pressure controls 60, 61, and moisture control 62 affect the operation of the system in the same manner as in Figure 1.

It will be noted that the present system not only controls the refrigerant supplied to the evaporators indirectly by by-passing some of that supplied by the compressors but also controls the refrigerant flow directly by modulating valves, thus giving smoother and more definite control. Further, the present system comprising modulating control of valves for each evaporator is especially suited for a relatively small number of evaporators and also for those installations in which some of the evaporators are of a comparatively large size or capacity. It is to be noted in both Figure 1 and Figure 2 under conditions of light loads, that is, when little cooling is desired, relatively high suction pressures are maintained. As the pressure and temperatures existing within an evaporator are closely related, it follows that relatively high minimum evaporator temperatures are maintained during periods of light loading. Conversely, as heavier loads are carried by the evaporators, as required by higher air temperatures necessitating more cooling, lower suction pressures and temperatures are permitted, thereby permitting the withdrawal of more moisture from the air. This is inherently advantageous for air conditioning work for normally the excess moisture within the air increases as the temperature rises above comfort levels.

It should also be noted that light cooling loads may be handled without throttling the suction line and causing the troubles associated with an unduly low suction pressure. Applicant by-passes a portion of the compressed refrigerant and thus controls his system without working his equipment under unfavorable conditions.

Figure 3:
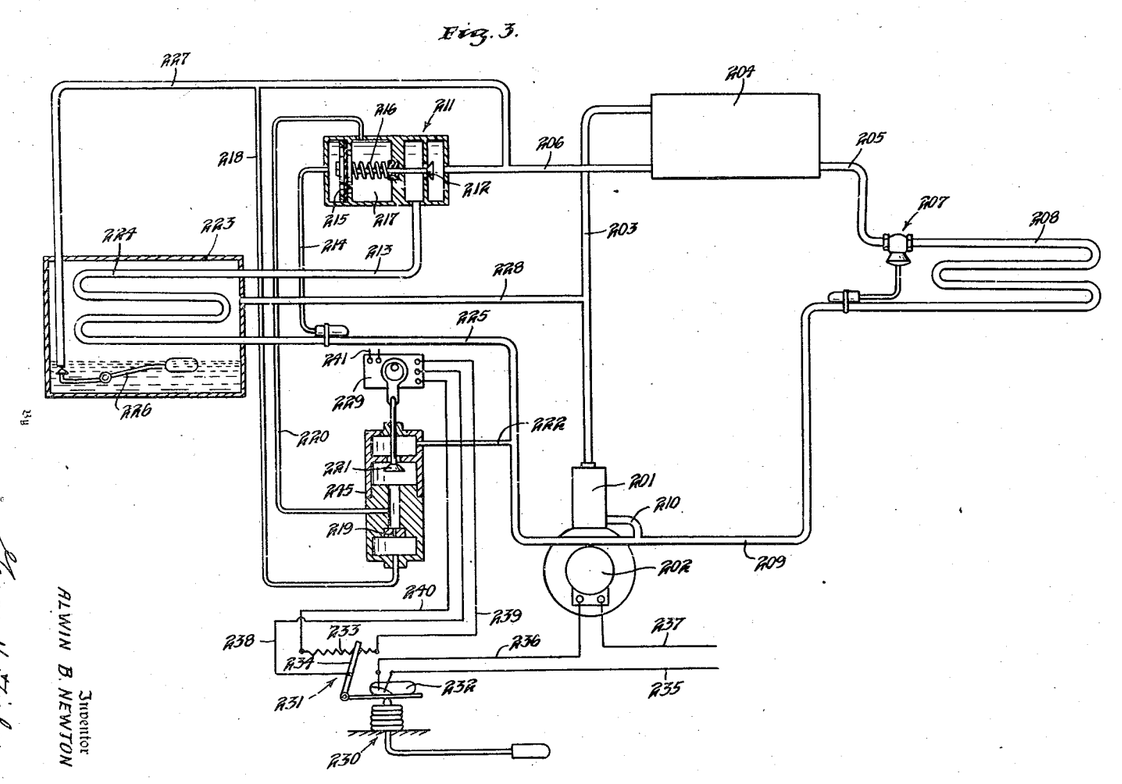
Figure 3 is a simplified modification of Figure 1 involving a single compressor and a single evaporator.

*Figure 3*

The system of Figure 3 is a modification of that shown in Figure 2 and comprises a compressor 201, driven by a motor 202, discharging through pipe 203 into condenser 204. Condenser 204 has liquid discharge lines 205 and 206. Liquid line 205 supplies thermostatic expansion valve 207 and its associated evaporator 208. The outlet of the evaporator 208 is connected to a main suction pipe 209 which is connected to compressor 201 by branch 210. It will be seen that the elements thus arranged comprise a conventional refrigeration system. Liquid line 206 connects to valve 211, said valve 211 having a valve member 212 controlling the flow of refrigerant from pipe 206 to pipe 213. Valve member 212 is urged toward open position by thermostatic bulb and capillary tube 214 coacting with diaphragm 215 and acting against spring 216, said valve being further controlled by refrigerant pressure within compartment 217, said pressure being that communicated to same through tube 220 from pilot control means 245. Pilot control means 245 includes an orifice 219 and a movable valve member 221 and is connected to the high pressure side of the system by tube 218 and to the low pressure side by tube 222. Orifice 219 restricts flow between tubes 218 and 220, whereas valve member 221 controls the flow through tube 222 to suction means 225 and 209. Pipe 225 is the outlet pipe of evaporator 224 which is contained within heat exchanger 223, said evaporator 224 being supplied with fluid by pipe 213. Heat exchanger 223 is supplied with hot, gaseous refrigerant through pipe 228 connecting with discharge pipe 203, said refrigerant being cooled and liquified within heat exchanger 223 by the cooling action of evaporator 224. The liquified refrigerant collects on the bottom of heat exchanger 223 until the level is sufficiently raised to actuate float valve 226, thereby permitting escape of liquid refrigerant through pipe 227 back to liquid line 206. Pipe 227 also supplies refrigerant bled through pipe 218 to pilot control means 245. Valve member 221 of 245 is actuated by modulating motor 229, said motor being controlled by thermostatic device 230. Thermostatic device 230 comprises potentiometer 231 and mercury switch 232, and actuates same in response to box temperature or the like. Potentiometer 231 includes resistor means 233 and arm 234. Mercury switch 232 controls the operation of motor 202, as will be brought out in the following operation schedule.

*Operation of Figure 3*

Upon a small demand for refrigeration, as determined by thermostatic device 230, mercury switch 232 is tilted to complete the circuit including motor 202 as follows: line 235, mercury switch 232, wire 236, motor 202, and line 237, thus placing motor 202 and compressor 201 in operation. At the same time, arm 234 is swept over a small amount of resistor 233, thus actuating valve member 221 toward open position by the circuit: arm 234, wire 238, modulating motor 229, wire 240, resistor 233, wire 239, motor 229. Wires 241 supply the actuating current for said motor. With valve member 221 in a partially opened position, the pressure in chamber 217 is lowered and valve 211 is partially opened thereby, wherein liquid refrigerant from condenser 204 flows through liquid line 206, valve 211, pipe 213, evaporator 224, pipe 225 and suction 209 back to compressor 201 thereby by-passing evaporator 208. Liquid refrigerant flowing through evaporator 224 is warmed and vaporized by heated gases flowing through pipe 228 from pipe 203 into heat exchanger 223, said heated gases being cooled, liquified, and discharged through pipe 227 into liquid line 206, as previously pointed out. Upon an increase in refrigeration demand, as determined by thermostatic device 230, arm 234 is swept further across resistor 233, and motor 229 moves valve member 221 toward closed position. Valve member 212 is thereby urged toward closed position due to the pressure building up in chamber 217 thus permitting less of the liquid refrigerant to be by-passed and thereby assuring a greater supply of refrigerant to evaporator 208 to accommodate said increased load. Further, with the larger portion of the refrigerant supplied through the thermostatic expansion valve, it becomes possible for the compressor to pump the evaporator down to lower pressures and temperatures.

Reviewing the operation of Figure 3, it is noted that at a slight load, valve member 221 is in an open position and valve 211 is open, thus permitting maximum diversion of liquid refrigerant from condenser 204 back to suction pipe 209, thereby supplying less refrigerant to expansion valve 207 and evaporator 208 and also increasing the suction pressure in 209, thereby minimizing the temperature reduction at evaporator 208. At full loads, valve member 221 is in a closed position, whereby valve 211 is closed, and no diversion of refrigerant takes place, hence the entire refrigerant supply of the system is directed through expansion valve 207 and evaporator 208, and the system is operating at full capacity. Obviously, suitable limit controls may be inserted in the control circuit of the compressor and valve member 221 may be controlled by conditions other than temperature, as for instance, relative humidity. It is noticed that a thermostatic expansion valve 207 is used in this modification, however, this valve may be of the same sort as modulating valve 211 and provided with supplementary control in response to psychrometric or other conditions, if so desired, or it may be of other suitable sort.

It is thus apparent that, in addition to providing excellent control of the refrigerating capacity, the system is regulated to inherently provide good humidity control. This is accomplished by providing a controlled lower limit of suction pressure in the system.

Figure 4:
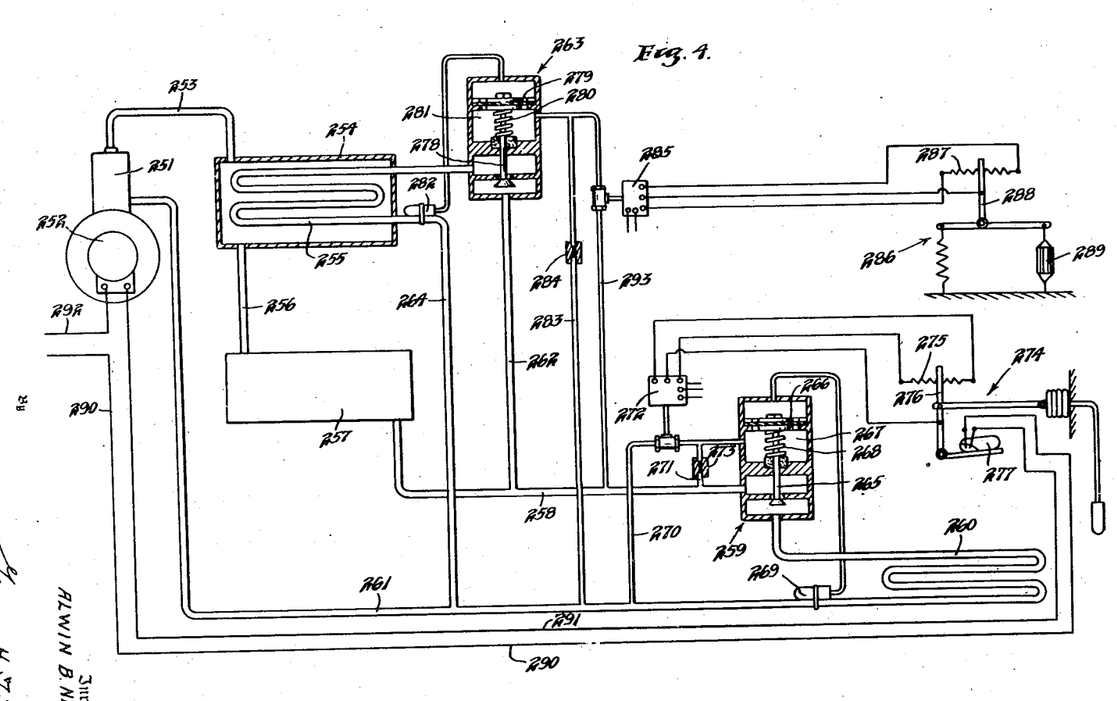
Figure 4 is a view similar to Figure 3 having the heat exchanger of the by-pass differently arranged and having modulating controls for both the by-pass and the evaporator.

*Figure 4*

Figure 4 shows a modification of the present invention wherein the by-pass heat exchanger is in series with the compressor and condenser. However, in this modification as in the others, the by-pass extends between a high pressure liquid line and the suction line of the compressor, the bypass being controlled as before. In detail, this figure comprises compressor 251 driven by motor 252, said compressor discharging through pipe 253 into heat exchanger 254, said heat exchanger 254 including evaporator coil 255. Heat exchanger 254 discharges through pipe 256 into condenser 257 from whence extends liquid line 258, said liquid line including modulating expansion valve 259 for controlling the supply of refrigerant to evaporator 260. The outlet of evaporator 260 is connected to compressor 251 by suction pipe 261. A by-pass pipe 262 connects liquid line 258 to modulating valve 263. Valve 263 controls refrigerant flow from pipe 262 to evaporator 255 in heat exchanger 254, said evaporator 255 discharging to suction line 261 through pipe 264.

Expansion valve 259 comprises a movable valve member 265 coacting with diaphragm 266, and urged toward closed position by spring 268, said diaphragm and valve member being urged toward open position by thermostatic bulb and associated capillary tube 269. Motion of valve member 265 is also influenced by refrigerant pressure existing in chamber 267, said pressure being the resultant due to refrigerant bled into said chamber through tube 271 and removed from said chamber through tube 270. Tube 270 is connected between suction line 261 and chamber 267 of valve 259, said tube 270 including modulating valve 272. Tube 271 includes an orifice 273 and is connected at one end to liquid line 258 and at the other end to tube 270 between valve 272 and chamber 267. By opening or closing valve 272, the pressure may be varied within chamber 267, thereby urging diaphragm 266 and its attached valve member towards either closed or open position. Valve 272 is controlled by thermostatic device 274 comprising potentiometer resistor 275, arm 276, and mercury switch 277.

Valve 263 is similar to valve 259 and comprises movable valve member 278, diaphragm 279, spring 280, chamber 281, and thermostatic bulb and tube 282. Chamber 281 is supplied with refrigerant through tube 293, and tube 283 provides discharge means for said refrigerant, said tube 283 being connected to suction pipe 261. Tube 283 includes orifice 284, and tube 293 includes modulating valve 285. Modulating valve 285 is controlled by humidity responsive means 286, which comprises potentiometer resistor 287, arm 288, and moisture responsive means 289. Operation of the various parts of the device will be brought out in the following schedule.

*Operation of Figure 4*

When temperatures are sufficiently low, as determined by thermostatic device 274, arm 276 is at the right of resistor 275, valve 272 is closed, mercury switch 277 is open and the compressor is not operating. When relative humidity is low, as determined by humidity responsive means 286, slider arm 288 is at the right of resistor 287, and when relative humidity is high, slider 288 is at the left of coil 287. In the position shown in the figure, there is a demand for cooling, slider 276 is about half-way across resistor 275 and compressor 251 is operating, the circuit being: wire 290, mercury switch 277, wire 291, motor 252, and wire 292. Valve 272 is about half open, hence valve 259 is partially open due to the combined effects of thermostatic bulb 269 and the pressure existing in chamber 267, the pressure being due to the high pressure refrigerant being bled into the chamber through tube 271, orifice 273 and a portion of tube 270, and due to the pressure being diminished by refrigerant flowing out through pipe 270 and valve 272 into suction line 261. A further increase in cooling demands may cause valve 272 to fully open, thereby lowering the pressure in chamber 267 and tending to force valve 259 fully open. It is thus seen that main evaporator 260 is controlled in response to temperature demands.

In the position shown, the humidity responsive means 289 is partially satisfied and slider 288 is at about the mid-point of travel on resistor 287, hence valve 285 is partially open. Upon permitting refrigerant to flow into chamber 281 of valve 263, and to flow out through pipe 283 and orifice 284 to suction line 261, the resultant pressure in chamber 281 operates, in conjunction with thermostatic bulb 282, to partially open valve 263. Opening valve 263 permits refrigerant to flow from high pressure liquid line 258 through pipe 262, valve 263, evaporator coil 255, pipe 264 and into main suction 261, thereby decreasing the amount of refrigerant available for main evaporator 260 and increasing the suction pressure in 261. As noted in the previous example, an increase in pressure in the main suction line limits the lower temperature of main evaporator 260, and thereby limits the amount of moisture that may be condensed out of the air passing over said coil 261.

Upon a decrease of relative humidity, as noted by a shrinking of element 289, the arm 288 moves toward the right of the resistor 287 and valve 285 moves towards closed position, thereby operating valve 263 toward open position, increasing the amount of by-passed refrigerant, and increasing the suction pressure in 261. This results in a higher temperature for evaporator 260 and diminishes further moisture withdrawal from the air passing over said evaporator 260. Upon an increase in the moisture content of the air passing over evaporator coil 260, element 289 responds by moving slider 288 to the left of resistor 287, whereby valve 285 is opened. Opening valve 285 causes the closing of valve 263 and the minimizing or stopping of the by-passing of refrigerant from liquid line 258 to suction line 261, thereby permitting suction pressures in 261 to diminish and permitting lower temperatures in evaporator 260, thus permitting said evaporator 260 to condense more moisture from the air and thus lower the relative humidity of said air, in addition to providing more cooling.

It will be noted in this modification, as in the others, that the by-passed refrigerant before being introduced into the suction line of the compressor, is cooled by its own expansion thereby protecting said compressor against unduly high suction temperatures. During periods of heavy loading of evaporator 260, very little refrigerant is by-passed, thus its influence on the temperature of suction gases flowing through 261 is of little consequence. It is during periods of light loading of main evaporator 260 in this system, as in any by-pass system, that the cooling of the by-passed refrigerant is of greatest importance for here the quantity of the by-passed refrigerant may be large compared to that flowing through evaporator 260. By flowing by-passed gas through valve 263 and coil 255, thus permitting it to expand, it not only cools hot gases in heat exchanger 254 but is itself cooled. Thus the suction gases fed into compressor 251 are always kept within reasonable limits of temperature and the compressor is thus protected from unduly high suction temperatures. Here again, it should be noted that the present system of by-passing refrigerant to control capacity is inherently suited to air conditioning for during periods when cooling is needed, it is usual that the relative humidity of the air to be treated increases with increase in temperature of same. During periods of modest temperatures, when little cooling is needed, but little humidity reduction is normally required, whereas during periods of relatively high air temperature and high relative humidity, the load on the system is increased and the demands for moisture reduction are also increased. Note that in this system greater diversion of refrigerant takes place during periods of lighter loading and a lesser diversion during period of higher loading. Thus, the evaporator temperatures are permitted to go lower during high loading and thus effect greater dehumidification. It is not to be considered however that the present system of control is limited to air conditioning, for it is equally applicable to other cooling installations wherein humidity control is also necessary, such as meat storage plants wherein a comparatively constant and relatively high humidity is required to prevent shrinkage of the meat or spoilage of same.

In the above examples, it is noted that the by-pass valves and expansion valves may be controlled by pilot valves, but it is contemplated that they may be directly controlled in any known manner. Further, the controls may be responsive to conditions other than those described. Also, suitable limit controls to protect the compressors, defrosting equipment, and the like, may be installed if desired, and other appurtenances usually associated with refrigeration systems, such as receivers, starting relays etc., are contemplated.

In the modifications of Figures 3 and 4, it may appear the systems are relatively wasteful of current, in that the load on the compressor remains fairly constant over a wide range of evaporator capacity. However, this is justified by the excellence of control obtained and by the minimizing of the stopping and starting of the compressor, thus preventing undue deterioration of the starting equipment used for the compressor. In small systems running under light loads, the deterioration due to short cycling is sometimes appreciable and more than offsets the added cost of current used in more continuous running.

It is to be noted, however, that as the system capacity is increased by adding additional individually driven compressors, the by-pass capacity is not increased a like amount and the over-all efficiency is thus improved.

By controlling a refrigerating system in such manner that the temperature of the evaporator is controlled, in addition to the amount of heat absorbed by same being regulated, applicant provides a system of control inherently suited to a large portion of refrigerating installations.

It should be noted that the present system is not only equally effective in large and small installations but is most efficient in larger systems, where efficiency is most demanded. In all of the modifications shown, it is seen that control is had without using undesirable temperatures or pressures of the refrigerant. Further, the equipment used is simple and dependable, and well adapted for commercial use.

The examples above given are to illustrate the present invention and are not to be considered as limiting the scope of said invention, the scope being determined by the following claims.

I claim as my invention:

1. In a refrigerating system, in combination, an evaporator for treating a medium, a thermostatic expansion valve connected in flow controlling relation therewith, means for supplying said expansion valve with refrigerant under relatively high pressure, means for removing refrigerant from said evaporator under relatively low pressure, the minimum temperature of said evaporator depending on the value of said low pressure, by-pass means for connecting said means for supplying refrigerant to said means removing refrigerant, said by-pass means including a valve for controlling the flow through same, the refrigerant flowing through said by-pass affecting the value of said low pressure, and means for regulating the valve in said by-pass in response to the psychrometric condition of said medium in such manner that the value of said low pressure may be varied in a manner to maintain said psychrometric condition constant.

2. In a refrigerating system, in combination, a compressor having hot gas discharge means, a condenser connected thereto and having outlet means, a thermostatic expansion valve, an evaporator, said expansion valve being connected between said condenser and said evaporator, a suction means connecting the outlet of the evaporator to the compressor, control means, said control means comprising a by-pass refrigerant line extending between said condenser outlet means and the suction means, heat exchanger means, said heat exchanger means placing a portion of said by-pass line in heat exchange relation with the hot gas discharge means from said compressor, by-pass valve means for controlling the flow of refrigerant through said by-pass line, pilot valve means for controlling the operation of said by-pass valve means, and means responsive to a psychrometric condition for controlling the operation of said pilot valve.

3. In a refrigerating system for conditioning air comprising a compressor having discharge means connected to an evaporator in contact with said air, said evaporator being connected by suction means to said compressor, a by-pass extending between said discharge means and the suction means, said by-pass including a valve, and means responsive to relative humidity for controlling said valve in such manner that the minimum pressure and the related temperature attainable by the evaporator may be raised to prevent dehumidification of the air and lowered when dehumidification is desired.

4. In a refrigerating system, a condenser having an inlet and an outlet means, a compressor having a hot gas discharge means connected to said inlet, an evaporator, said condenser providing a supply of liquid refrigerant for said evaporator, the outlet of said evaporator being connected by suction means to the suction of the compressor, a heat exchange means having two passages, and conduit means connecting the inlet of one of said passages to the outlet means of the condenser, said conduit means including a modulating valve, the outlet of said one passage being connected to said suction means, the other passage having its inlet connected to said hot gas discharge and having its outlet connected to said outlet means, said modulating valve controllably diverting refrigerant away from said evaporator in a manner to control the refrigerant supplied to said evaporator.

5. In a refrigerating system, a compressor having a hot gas discharge, a condenser having an inlet and an outlet means, means connecting said inlet and said hot gas discharge, said condenser supplying liquid refrigerant, an evaporator having an inlet and an outlet, a liquid line connecting said condenser outlet and said evaporator inlet, suction means connecting said evaporator outlet and said compressor, a heat exchange means having two passages, conduit means connecting the inlet of one of said passages to the outlet means of said condenser, said conduit means including a valve, means connecting the outlet of said one passage to said suction means, means connecting the inlet of the other passage to the hot gas discharge, and means connecting the outlet of said other passage to said outlet means, said heat exchange means thereby acting both as a condenser and an evaporator and limiting the refrigerant supplied to the first named evaporator.

6. In a refrigerating system, a compressor having a hot gas discharge, a condenser having an inlet connected to said discharge and having outlet means supplying liquid refrigerant, a thermostatic expansion valve and an associated evaporator, a liquid line connecting said condenser outlet means and said thermostatic expansion valve, suction means connecting the outlet of said evaporator and said compressor, a heat exchange means having two passages, by-pass means including one of said passages, the inlet of said by-pass means being connected to said liquid line, the outlet of said by-pass being connected to said suction means, said by-pass means including a modulating valve, means connecting the inlet of the other passage to the hot gas discharge of the compressor, means connecting the outlet of said other passage to said liquid line, said modulating valve being urged open by means responsive to the temperature of the gases leaving said one passage and being urged open or closed by refrigerant pressure affecting said modulating value, said refrigerant pressure being the resultant of a connection from a liquid line of the system and a connection from a low pressure refrigerant line of the system, said connections being controlled by restricted means in one of said connections and pilot valve means in the other of said connections.

7. In a refrigerating system, a compressor having a hot gas discharge means, a condenser having an inlet connected to said discharge and having outlet means for supplying liquid refrigerant, a thermostatic expansion valve and a connected evaporator, a liquid line connecting said outlet means and said expansion valve, suction means connecting the outlet of said evaporator to the suction of the compressor, a heat exchange means comprising two passages, conduit means connecting the inlet of one of said passages to said liquid line, means connecting the outlet of said passage to said suction means, said conduit means including a modulating valve, means connecting the inlet of the other passage to the hot gas discharge means, means connecting the outlet of said other passage to said outlet means, and control means for said modulating valve comprising thermostatic means responsive to the temperature of the gases leaving said one passage and opposing resultant refrigerant pressure means, said resultant refrigerant pressure being varied in response to a selected control condition, said resultant pressure being that due to a connection to a high pressure refrigerant line of the system and a connection from a low pressure refrigerant line of the system, one of said connections being controlled by restricted means and the other of said connections being controlled by a pilot valve, said pilot valve being controlled in response to said selected condition.

8. In a refrigerating system, a compressor having discharge means and suction means, a condenser supplied with refrigerant by said discharge means and capable of supplying liquid refrigerant through outlet means, an evaporator having a thermostatic expansion valve connected in flow controlling relation therewith, a liquid line connecting the outlet means of said condenser with said expansion valve, a suction line connecting the outlet of said evaporator and said suction means, by-pass means, said by-pass means comprising a heat exchanger having two passages therethrough, means including one of said passages connecting said liquid line and said suction line, valve means adjustable in response to a selected condition controlling flow through said one passage, the other passage including means connecting said compressor discharge and said outlet means, and float valve means for controlling flow through said other passage.

9. In a refrigerating system, a plurality of evaporators, said evaporators each being provided with expansion means and a modulating control valve and having connected therewith individual central devices responsive to conditions affected by their respective evaporators, compressing means having suction and discharge means, a condenser, said discharge means supplying refrigerant to said condenser, said condenser supplying liquid refrigerant to said evaporators, said suction means withdrawing gaseous refrigerant from said evaporators, by-pass evaporator means receiving liquid refrigerant from said condenser and discharging expanded refrigerant to said suction means, valve means controlling the refrigerant flow to said by-pass evaporator, said valve means being controlled by refrigerant pressure, said pressure being the resultant due to a connection with high pressure refrigerant means of the system and another connection with the said suction means, flow restricting means in one of said connections and pilot valve means in the other connection, and means operated jointly by said control devices for governing the operation of said pilot valve.

10. In a refrigerating system comprising a high pressure side and a low pressure side, said high pressure side including a compressor, a heat exchanger, a condenser, a liquid line and an expansion valve, said low pressure side including an evaporator and suction means connecting with the compressor, a by-pass connecting said liquid line and said suction means, said by-pass including a valve and extending through said heat exchanger, said expansion valve being of the superheat type and adjustable in response to temperature, and means for additionally adjusting said by-pass valve in response to re'ative humidity.

11. In a refrigerating system, a compressor having suction and discharge means, a condenser, a heat exchanger, said discharge means extending through said heat exchanger and into said condenser, an expansion valve and evaporator, a liquid line extending from the condenser to said expansion valve and thence to said evaporator, the outlet of the evaporator being connected by suction means to the suction of the compressor, said expansion valve being urged open by means responsive to the temperature of the gases leaving the evaporator and being urged closed by resultant refrigerant pressure, said resultant pressure being due to the combined effects of connections with the liquid line and the suction line, means controlling said connections including restrictive means in one connection and modu'ating valve means in another connection, said modulating valve means being controlled in response to a selected condition, a by-pass connecting said liquid line and said suction means, valve means controlling said by-pass, said by-pass extending through said heat exchanger, said by-pass valve being urged open by means responsive to the temperature of the by-passed gases leaving the heat exchanger and being urged closed by resultant refrigerant pressure due to additional connections to the liquid line and to the suction line, and means controlling said connections comprising restrictive means in one of said additional connections and pilot valve means in another of said additional connections, said pilot valve means being regulated by means responsive to a selected condition.

12. In a refrigerating system, a compressor having suction and discharge means, a condenser, a by-pass heat exchanger, said discharge means extending through said heat exchanger and into said condenser, an expansion valve and evaporator, a liquid line extending from the condenser to said expansion valve and thence to said evaporator, the outlet of the evaporator being connected by suction means to the suction of the compressor, said expansion valve being urged open by means responsive to the temperature of the gases leaving the evaporator and being urged closed by refrigerant pressure, said refrigerant pressure being that due to the combined effects of connections with the liquid line and the suction line, means controlling said connections including restrictive means in one of said connections and modulating valve means in the other of said connections, means responsive to a selected condition for controlling said modulating valve means, a by-pass connecting said liquid line and said suction means, valve means in said by-pass, said by-pass extending through said heat exchanger, and means responsive to a predetermined condition for regulating said by-pass valve.

13. In a refrigerating system having a high pressure side and a low pressure side, said low pressure side including an evaporator for cooling a medium, the minimum temperature of said evaporator depending on the minimum pressure maintained in said low pressure side, means in addition to said evaporator for introducing cooled gaseous refrigerant into said low pressure side to influence the pressure in same, and means responsive to a selected condition of said medium for controlling said additional means.

14. In a refrigerating system having a high pressure side and a low pressure side, expansion valve means regulating refrigerant flow between said high pressure side and said low pressure side in a manner to maintain said low pressure side refrigerant at a predetermined condition of superheat, and means including a by-pass around said evaporator for controlling the pressure of said low pressure side in response to an atmospheric condition.

15. In a refrigerating system including a high pressure source of liquid refrigerant, return means receiving gaseous refrigerant under a low pressure, an expansion valve, an evaporator, said expansion valve being connected to said refrigerant source and said evaporator and controlling the flow of said liquid refrigerant to said evaporator in such manner that the refrigerant flowing from said evaporator to said return means will have at least a predetermined superheat; control means comprising a by-pass extending between said source and return means, by-pass valve means controlling said by-pass, and means responsive to an atmospheric condition affected by the operation of said system for controlling said by-pass valve means in a manner to control the pressure of said refrigerant flowing in said return means.

16. In a refrigerating system for a plurality of zones, each of the zones being provided with an evaporator having an expansion means, compressing means having suction and discharge means, a condenser, said discharge means supplying compressed gaseous refrigerant to said condenser, said condenser supplying liquid refrigerant to said expansion means and evaporators, said suction means withdrawing refrigerant from said evaporators, additional evaporator means having a valve associated therewith and supplied with liquid refrigerant from said condenser, the outlet of said additional evaporator means being connected to said suction means, said additional evaporator means being in heat exchange relation with a source of heat energized as a function of the operation of said system, control means comprising a plurality of devices responsive to conditions in the respective zones indicative of a need for operation of the system, and means connecting said condition responsive devices in joint controlling relation to said valve.

17. In a cooling system for a plurality of zones, each of said zones having an evaporator and a connected expansion means, a plurality of devices responsive to conditions in the respective zones indicative of a need for the operation of the evaporators for those zones, means measuring the controlling effect of each of said condition responsive means, compressing means having suction and discharge means, a condenser, said discharge means supplying gaseous refrigerant to said condenser and said condenser supplying liquid refrigerant to said expansion means and evaporator, said suction means receiving refrigerant from said evaporators, an additional evaporator and a control valve therefor also connected to said discharge means and said suction means, said additional evaporator being in heat exchange relation with heated means energized as a function of the operation of said compressor, and means including an electrical circuit for connecting the effect measuring means of said condition responsive devices in controlling relation to said valve so that said valve is controlled in response to the cumulative effect of said devices.

18. In a refrigerating system comprising a plurality of evaporators, expansion means and a control valve connected to each of said evaporators, control means connected in controlling relation to each of said valves and comprising individual devices responsive to predetermined conditions, a plurality of compressors having common suction and discharge means, a condenser, a liquid line, said discharge means supplying refrigerant to said condenser and said condenser supplying liquid refrigerant through said liquid line to said evaporators, gaseous refrigerant being withdrawn from said evaporators through said suction means, refrigerant by-pass means extending between said liquid line and the suction means, said by-pass means including an adjustable valve means, an adjustable controller means, means connecting said condition responsive means in controlling relation to said controller so that the adjustment of said controller is effected by said condition responsive means, switching means for each of said compressors, said controller being connected in operative relation to said switching means for sequential operation of said compressors, and means connecting said controller in controlling relation to said by-pass valve.

19. In a refrigerating system, a plurality of evaporators, each of said evaporators being provided with an expansion means and a solenoid control valve and having associated therewith a control device responsive to a condition affected by its respective evaporator, a plurality of compressors having common suction and discharge means, sequential switching means for said compressors, a condenser, a liquid line, said discharge means supplying refrigerant to said condenser and said condenser supplying liquid refrigerant through said liquid line to said evaporators under control of said expansion means and said solenoid valves, gaseous refrigerant being withdrawn from said evaporators by said suction means, refrigerant diverting means comprising a by-pass extending between the liquid line and the suction means, an adjustable valve for controlling said by-pass, means connecting each of said control devices in individual controlling relation to its respective solenoid valve, a controller, means connecting said control devices in joint controlling relation to said controller, means connecting said controller in operative relation to said switching means and said by-pass valve, and humidity responsive means cooperating with said controller in controlling said by-pass valve.

ALWIN B. NEWTON.

REFERENCES CITED

The following references are of record in the file of this patent:

UNITED STATES PATENTS

| Number | Name | Date |
| --- | --- | --- |
| 2,206,115 | Obrieter, Jr. | July 2, 1940 |
| 2,223,900 | Pownall | Dec. 3, 1940 |

Certificate of Correction

Patent No. 2,461,760.                                                                February 15, 1949.

ALWIN B. NEWTON

It is hereby certified that error appears in the printed specification of the above numbered patent requiring correction as follows:

Column 17, line 2, claim 9, for the word "central" read *control*;

and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*